Figure 1:
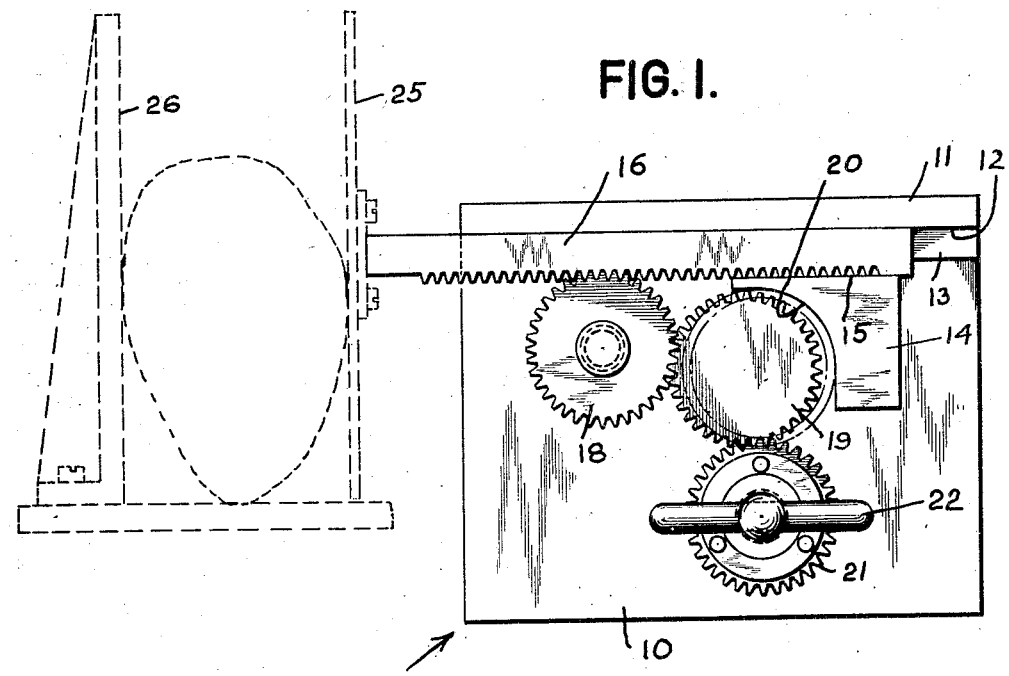

April 12, 1932.   G. R. WOOD   1,853,188
MECHANICAL MOTION DEVICE
Filed Aug. 28, 1930

INVENTOR
George R. Wood
BY ATTORNEY
W M Wilson

Patented Apr. 12, 1932

1,853,188

UNITED STATES PATENT OFFICE

GEORGE R. WOOD, OF TORONTO, ONTARIO, CANADA, ASSIGNOR TO DAYTON SCALE COMPANY, OF DAYTON, OHIO, A CORPORATION OF NEW JERSEY

MECHANICAL MOTION DEVICE

Application filed August 28, 1930. Serial No. 478,394.

This invention relates to mechanical motion devices.

The object is to provide a novel one-way drive mechanism.

More specifically, the object is to provide a novel gear mechanism to drive an element positively in one direction.

Various other objects and advantages of my invention will be obvious from the following particular description of one form of mechanism embodying the invention or from an inspection of the accompanying drawings; and the invention also constitutes certain new and novel features of construction and combination of parts hereinafter set forth and claimed.

Figure 2:
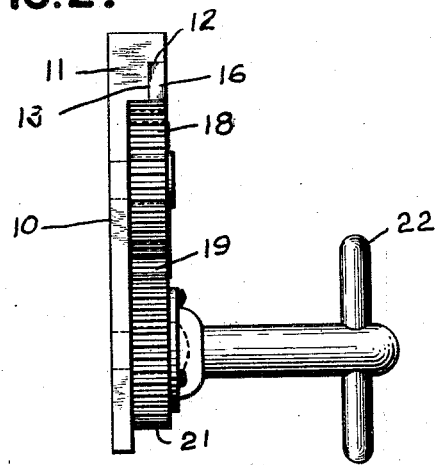

In the drawings:

Fig. 1 is a front view of the mechanism, and Fig. 2 is an end view of the mechanism looking in the direction of the arrow in Fig. 1.

In detail, the mechanism comprises a supporting plate 10 which is provided along one side thereof with a bar 11 having a right angular smoothly finished guide track consisting of sides 12 and 13.

The plate 10 is also provided with a piece 14 having a flat edge portion 15 parallel to the track side 12. The sides 12 and 13 and the edge 15 combine to form a slideway for the rack 16.

Journaled on plate 10 is a driven pinion 18 meshing with the rack 16. The pinion 18 is driven in one direction by an intermediate pinion 19 having no fixed connection to the plate 10 but freely, translatably, movable thereon. In one direction the bodily movement of pinion 19 is limited by an arcuate quadrant groove 20 formed on substantially the same radius as the pinion 19 in the piece 14. The movement of pinion 19 in the other direction is limited by its meshing engagement with pinion 18.

Adapted to constantly mesh with pinion 19 is a driving pinion 21 journaled in plate 10 and provided with a handle 22.

In operation, the handle 22 when moved counterclockwise as shown in Fig. 1 first causes pinion 21 to carry pinion 19 bodily to the left as though it were a rack. The pinion 19 has nothing to restrain such movement towards the left until it engages pinion 18, after which movement of handle 22 results in a purely rotational movement of pinion 19 which in turn rotates pinion 18 to move the rack 16 to the left.

When handle 22 is moved clockwise, as viewed in Fig. 1, the pinion 19 is translated bodily to the right until engaged by arcuate groove 20. The pinion 19 is thereby demeshed from pinion 18 so that its rotation has no effect on the latter. The wall of groove 20 extends between pinion 19 and rack 16 to prevent their intermeshing.

The mechanism herein described may be used in clamp or press structures. Thus a clamp plate 25 (as shown in dotted lines in Fig. 1) may be attached to one end of rack 16 to clamp an object against a base 26 (shown in dotted lines in Fig. 1).

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims:

1. A mechanical device comprising a support, a driven pinion journaled thereon, a rack meshed with the driven pinion and adapted to be driven thereby, a driving member carried by the support, a handle fixed to the driving member for actuating the latter, an intermediate pinion loosely carried by the support and adapted to be moved by operation of the driving member in one direction towards the driven pinion and into mesh therewith, and thereafter rotated to rotate the driven pinion, the intermediate pinion being demeshed from the driven pinion by operation of the driving member in the opposite direction, and an abutment for limiting the demeshing movement of the intermediate pinion, the abutment having a portion located between the latter pinion and the rack to prevent operation of the latter by the intermediate pinion.

2. A device comprising a driven pinion, a driving pinion provided with a handle for turning it, a floating idler pinion between the driving and driven pinion, the floating pinion being automatically meshed and demeshed from the driven pinion upon rotation of the driving pinion and in accordance with the direction of rotation of the latter pinion, a vertically disposed plate on which the pinions are carried, the plate having a projection provided with a curved surface for guiding the meshing and demeshing movements of the floating pinion and having above said curved surface, a flat, horizontally disposed ledge, the plate having an integral horizontal ledge overhanging and spaced from the first-mentioned ledge, and a rack guided between said ledges in position to be meshed with and driven by said driven pinion.

In testimony whereof I hereto affix my signature.

GEORGE R. WOOD.